US009964149B2

(12) United States Patent
Varnoux et al.

(10) Patent No.: US 9,964,149 B2
(45) Date of Patent: May 8, 2018

(54) CAGE FOR A BALL BEARING PROVIDED WITH A WIRE AND ADDED INTERPOSED PARTS

(71) Applicants: Laurent Varnoux, Saint Avertin (FR); Bruno Constant, Tours (FR); Olivier Verbe, Tours (FR)

(72) Inventors: Laurent Varnoux, Saint Avertin (FR); Bruno Constant, Tours (FR); Olivier Verbe, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/277,391

(22) Filed: Sep. 27, 2016

(65) Prior Publication Data

US 2017/0089391 A1 Mar. 30, 2017

(30) Foreign Application Priority Data

Sep. 30, 2015 (FR) ...................................... 15 59253

(51) Int. Cl.
*F16C 33/38* (2006.01)
*F16C 33/42* (2006.01)
(Continued)

(52) U.S. Cl.
CPC .......... *F16C 33/3831* (2013.01); *F16C 19/06* (2013.01); *F16C 33/3887* (2013.01);
(Continued)

(58) Field of Classification Search
CPC .. F16C 19/06; F16C 33/3818; F16C 33/3831; F16C 33/3887; F16C 33/418; F16C 33/42; F16C 2226/74; F16C 2226/76
(Continued)

(56) References Cited

U.S. PATENT DOCUMENTS 970,132 A 9/1910 Sonnberg
1,078,940 A * 11/1913 Modler .................. F16C 19/08
384/532

(Continued)

FOREIGN PATENT DOCUMENTS

DE 181953 C 2/1906
DE 102008014552 A1 * 9/2008 .............. F16C 33/54
(Continued)

*Primary Examiner* — Marcus Charles
(74) *Attorney, Agent, or Firm* — Bryan Peckjian; SKF USA Inc. Patent Dept.

(57) ABSTRACT

A cage for a ball bearing is provided with a wire having a first group of heels spaced apart in the circumferential direction and form a first discontinuous ring, a second group of heels spaced apart in the circumferential direction and form a second discontinuous ring, and a plurality of connecting portions extending between one of the heels of the first group and second group. The connecting portions and the heels of the first group and/or the second group delimit a plurality of spaces each intended to receive a ball of the bearing. The cage also provides at least one interposed part disposed inside each space and is provided with a body for accommodating a ball and coupling means for fastening the body to at least one of the connecting portions of the wire. Each of the bodies of the interposed parts fully positioned in the circumferential direction.

10 Claims, 8 Drawing Sheets

(51) Int. Cl.
*F16C 19/06* (2006.01)
*F16C 33/41* (2006.01)

(52) U.S. Cl.
CPC ............ *F16C 33/418* (2013.01); *F16C 33/42* (2013.01); *F16C 33/3818* (2013.01); *F16C 2226/74* (2013.01)

(58) Field of Classification Search
USPC ........ 384/523, 525, 532, 537, 538, 533, 539
See application file for complete search history.

(56) References Cited

U.S. PATENT DOCUMENTS

| | | | | |
|---|---|---|---|---|
| 1,362,097 | A | * | 12/1920 | Gullbrandsson ........ F16C 33/41 384/525 |
| 1,783,141 | A | * | 11/1930 | Russell ................. F16C 19/163 384/525 |
| 3,362,249 | A | * | 1/1968 | Richoux ................... F16C 1/28 464/173 |

FOREIGN PATENT DOCUMENTS

| | | | | | |
|---|---|---|---|---|---|
| DE | 1020015200515 | A | * | 1/2015 | ............. F16C 33/54 |
| FR | 2655099 | A1 | | 5/1991 | |
| GB | 584120 | A | * | 1/1947 | ............ F16C 19/364 |
| GB | 781153 | A | * | 8/1957 | ............. F16C 33/41 |
| GB | 1515643 | | * | 6/1978 | ............. F16C 33/42 |
| GB | 1515643 | A | | 6/1978 | |
| GB | 2533301 | A | * | 6/2016 | .......... F16C 33/6629 |
| JP | 2007056894 | A | | 3/2007 | |

* cited by examiner

CAGE FOR A BALL BEARING PROVIDED WITH A WIRE AND ADDED INTERPOSED PARTS

CROSS REFERENCE TO RELATED APPLICATIONS

This application claims priority to French patent application no. 1559253 filed on Sep. 30, 2015, the contents of which are fully incorporated herein by reference.

FIELD OF THE INVENTION

The invention relates to the field of rotary bearings of the ball bearing type and more particularly that of cages with which such ball bearings are equipped.

BACKGROUND OF THE INVENTION

Ball bearings can be used in multiple fields of application in order to provide a mechanical connection of the "swivel" or "pivot" type between two parts. Such ball bearings generally consist of an inner race, intended to be secured to a first part, an outer race, intended to be secured to a second part, and a plurality of balls that each extend in a space provided between the inner race and the outer race. The balls are generally kept spaced apart circumferentially by a cage.

Conventionally, a cage can be produced by molding a synthetic material and may provide a plurality of cells that each form a space for one of the balls.

A drawback that is generally encountered in the production of a cage by molding is the frequent appearance of manufacturing defects, and in particular surface defects, notably on the surfaces that are intended to come into contact with the races or on the surfaces that are intended to come into contact with the balls. These manufacturing defects are all the more frequent the greater the mass of the cage relative to the volume left free between the two races of the bearing.

In order to remedy this drawback, use is generally made of a particular tooling for manufacturing the ball bearing cages that is specific to each cage design. However, such a solution is not entirely satisfactory since it creates an additional manufacturing cost for each ball bearing, this being all the greater the smaller the manufacturing volume.

The invention aims to remedy these drawbacks. More particularly, the invention aims to provide a ball bearing cage that can be manufactured economically and ensures the function of holding the balls of the bearing more effectively.

BRIEF SUMMARY OF THE INVENTION

To this end, a cage for a ball bearing is proposed, the cage being provided with a wire providing a first group of heels that are spaced apart from one another in the circumferential direction and form a first discontinuous ring, a second group of heels that are spaced apart from one another in the circumferential direction and form a second discontinuous ring, and a plurality of connecting portions that each extend between one of the heels of the first group and one of the heels of the second group. The connecting portions and the heels of the first group and/or of the second group delimit a plurality of spaces that are each intended to receive a ball of the bearing. The cage also may provide at least one interposed part that is disposed inside each space and is provided with a body for accommodating a ball and coupling means for fastening the body to at least one of the connecting portions of the wire delimiting the space. Each of the bodies of the interposed parts is entirely situated in the circumferential direction between the connecting portions of the wire delimiting the space.

Such a cage provided notably with a wire and a plurality of interposed parts attached to the wire can be manufactured from a plurality of materials having a smaller volume than cages known from the prior art. As a result, it is easier to produce the parts of such a cage and the frequency at which manufacturing defects arise is lower.

Advantageously, each space is delimited exclusively by a heel and/or at least one connecting portion extending from the heel.

According to one embodiment, each space is delimited by a heel and by two successive connecting portions extending from the heel.

Advantageously, the coupling means of each interposed part comprise at least one rib that extends from an outer surface of the body of the interposed part and is provided with a groove shaped for the passage of and for retaining the wire.

Preferably, the groove is shaped for the passage of and for retaining the associated connecting portion of the wire.

In one embodiment, the cage may provide, for each space, exactly two interposed parts.

In one such embodiment, provision can also be made for the coupling means of each interposed part to comprise at least a first, a second and a third rib that each extend from an outer surface of the body of the interposed part, each of the first and second ribs being provided with a groove for the passage of and for retaining the associated connecting portion of the wire, the third rib having a front surface in contact with the associated heel of the wire. Advantageously, the front surface is flat.

Still in this embodiment, provision can also be made for the coupling means of each interposed part to comprise at least a first and a second rib that each extend from an outer surface of the body of the interposed part, the first rib providing a groove for the passage of and for retaining the associated connecting portion of the wire, and the second rib providing a groove for the passage of and for retaining the associated heel of the wire.

In another embodiment, the cage may provide, for each space, a single interposed part, the coupling means of each interposed part providing at least two ribs that extend from an outer surface of the body of the interposed part and are each provided with a groove for the passage of and for retaining two separate connecting portions of the wire.

Preferably, the outer surface is in point contact with a heel of the wire.

According to one advantageous embodiment, the interposed parts are identical.

According to another aspect, a ball bearing providing an inner race, an outer race, at least one row of balls and at least one cage as defined above is proposed.

BRIEF DESCRIPTION OF THE SEVERAL VIEWS OF THE DRAWING

Further aims, features and advantages of the invention will become apparent from reading the following description, which is given purely by way of non-limiting example and with reference to the appended drawings, in which.

DETAILED DESCRIPTION OF THE INVENTION

Figure 1:
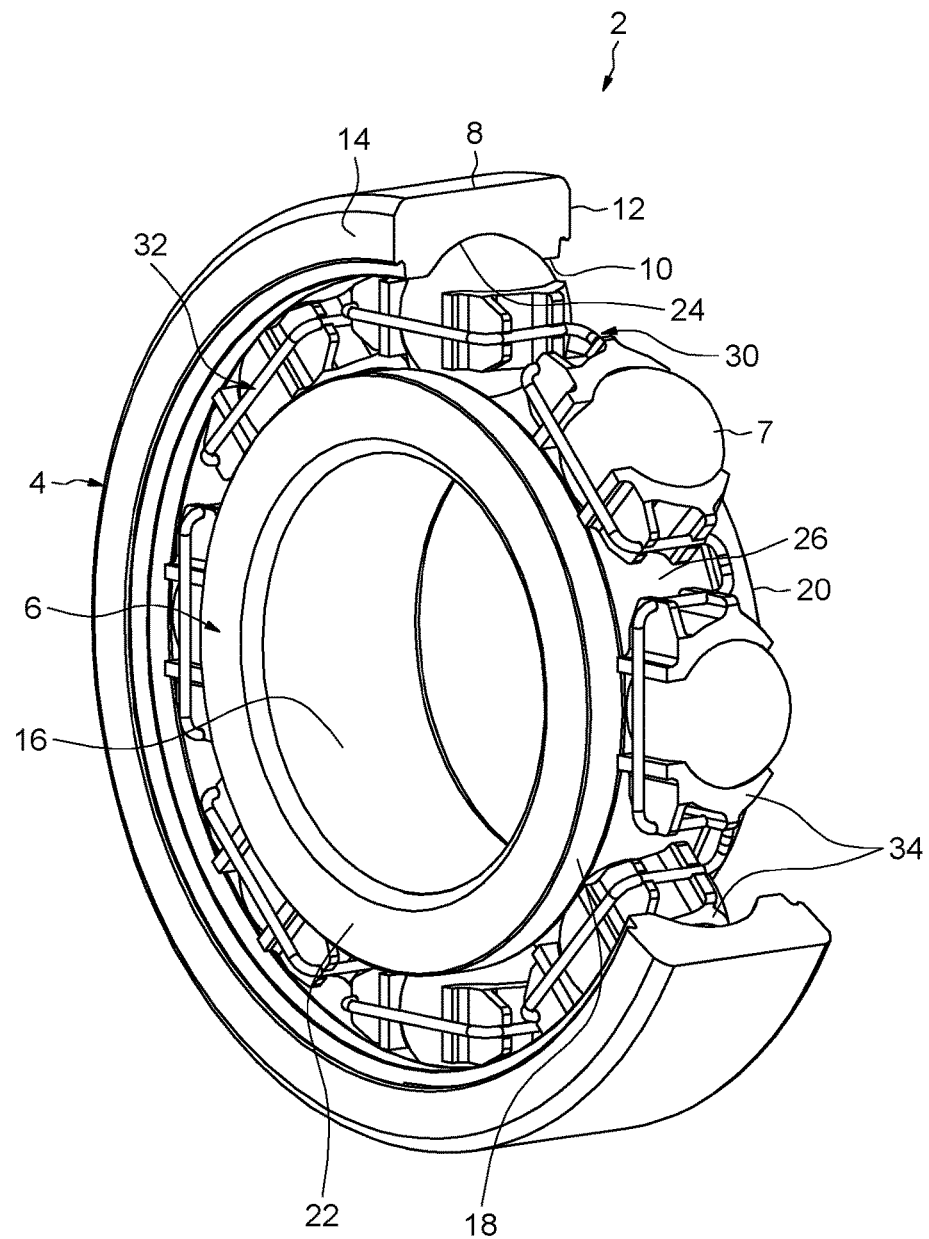
FIG. 1 illustrates a perspective view of a ball bearing provided with a cage according to a first exemplary embodiment of the invention.

With reference to FIG. 1, the ball bearing 2 may provide an outer race 4 (illustrated partially), an inner race 6 and a row of balls 7 interposed between the races 4 and 6. The outer race 4 and the inner race 6 are both cylindrical and disposed coaxially with respect to one another. For the present description, unless stated otherwise, an axial direction and a radial direction are defined relatively with respect to the axis of the ball bearing 2.

The outer race 4 may provide a cylindrical outer surface 8, a cylindrical bore 10 situated radially away from the outer surface 8, and two opposite radial front surfaces 12 and 14 that axially delimit the outer surface 8 and the bore 10. In the same way, the inner race 6 may provide a cylindrical bore 16, a cylindrical outer surface 18 situated radially away from the bore 16, and two opposite radial front surfaces 20 and 22 which axially delimit the bore 16 and the outer surface 18. Tracks 24, 26 are made in the races 4 and 6, respectively, to form raceways for the balls 7.

The bearing 2 also may provide a cage 30 for maintaining the circumferential spacing of the balls 7. The cage 30 is disposed radially between the outer race 4 and the inner race 6. The function of the cage 30 is to define a housing for each of the balls 7 of the bearing 2 and to keep the balls 7 inside their respective housings. To this end, the cage 30 has in particular a wire 32 and a plurality of interposed parts 34.

Figure 2:
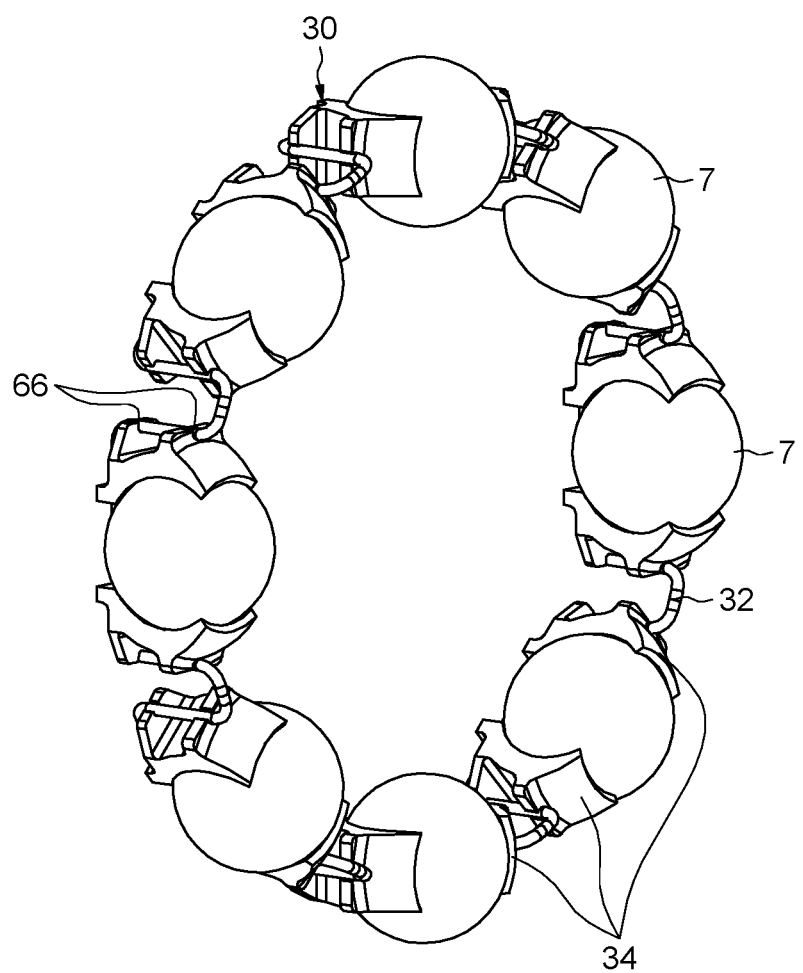
FIG. 2 illustrates another perspective view of the cage of the bearing in FIG. 1, equipped with a plurality of balls.
Figure 3:
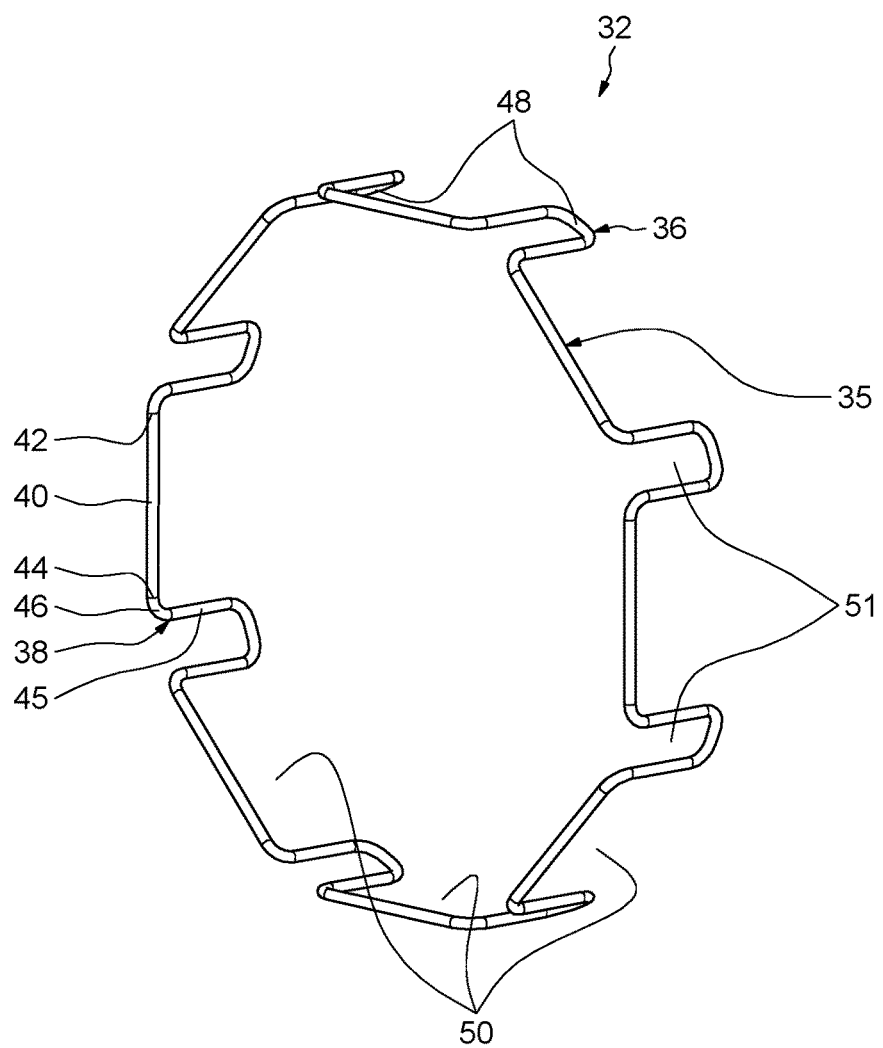
FIG. 3 illustrates a perspective view of the wire of the cage in FIG. 2.

With reference now to FIG. 3, the wire 32 is closed. The wire 32 forms a first discontinuous ring 35, a second discontinuous ring 36 and a plurality of connecting portions 38 extending between the discontinuous rings 35 and 36. The discontinuous rings 35 and 36 are parallel to one another, while the connecting portions 38 extend substantially perpendicularly to the plane of the rings 35 and 36. By virtue of the sinuous shape of the wire 32, a plurality of spaces 50 for accommodating the balls 7 are defined. As can be seen in FIG. 2, the balls 7 are kept spaced apart from one another by the interposed parts 34. More specifically, it should be noted that there is no contact between the wire 32 of the cage and the balls 7. By avoiding contact between the wire 32 and the balls 7, the contact between the balls 7 and the cage 30 passes entirely via the interposed parts 34. This makes it possible to minimize the friction due to the sliding of the balls against the cage, through an appropriate choice of the material and the shape of the interposed parts.

Although the wire 32 is made in one piece in the exemplary embodiment illustrated, it is possible to envisage a wire made up of several parts that are joined together, without departing from the scope of the invention.

The interposed parts 34 are shaped so as to be secured to the wire 32 by virtue of coupling means, as will be explained further in the following text. These coupling means are designed to allow the interposed parts 34 to pivot about the connecting portions 38, this resulting in greater flexibility of the cage 30 under the pressure exerted by the balls 7 and thus in an additional reduction in the friction. Moreover, fitting and removal are rendered easier.

As can be seen in FIG. 3, the first discontinuous ring 35 is substantially in the shape of a regular polygon, each of the sides thereof being intended to be disposed next to a ball 7 of the bearing. In the exemplary embodiment illustrated, the first discontinuous ring 35 is substantially in the shape of a regular octagon and is thus suitable for incorporation in a bearing having eight balls. The first discontinuous ring 35 is made up of a first group of heels 40. In the exemplary embodiment illustrated, the first group of heels may provide eight heels 40. The heels 40 are spaced apart from one another in the circumferential direction. The heels 40 are made up of portions of the wire 32 that are substantially straight, substantially equal in length and all extend substantially in one and the same plane. Each heel 40 has a first end 42 and a separate second end 44 away from the first end 42. The length of the heels 40 is greater than the diameter of one ball 7 intended to cooperate with the cage 30 and preferably less than this diameter multiplied by a factor of 1.5.

The connecting portions 38 each extend from one end 42 or 44 of a heel 40. More particularly, for each heel 40, exactly two connecting portions 38 extend, one from the end 42 and the other from the end 44. Thus, in the exemplary embodiment shown, the cage 30 has sixteen connecting portions 38. Each of the connecting portions 38 extends generally in a direction orthogonal to the plane defined by the heels 40. Moreover, the connecting portions 38 all extend in the same direction from the plane defined by the heels 40 and have substantially identical shapes and dimensions. Each connecting portion 38 may provide a rectilinear part 45 that is directed substantially in the direction orthogonal to the plane defined by the heels 40. As a corollary, the rectilinear part 45 of each connecting portion 38 is substantially perpendicular to the heel 40 adjacent to the connecting portion 38. The respective rectilinear parts 45 of the connecting portions 38 are substantially the same length, namely between half and three quarters of the diameter of a ball 7 intended to cooperate with the cage 30. Each connecting portion 38 also may provide a curved part 46 that respectively connects the rectilinear part 45 of the connecting portion 38 to one of the ends 42 and 44.

The second discontinuous ring 36 is made up of a second group of heels 48 that are spaced apart from one another in the circumferential direction. In the exemplary embodiment illustrated, the second group of heels may provide eight heels 48 that serve to connect the connecting portions 38 in pairs. More particularly, each heel 48 connects on the one hand a connecting portion 38 extending from one end 42 of a first heel 40 and on the other hand a connecting portion 38 extending from one end 44 of a second heel 40, separate from the first heel, the first and second heels 40 of the first group being two adjacent sides of the polygonal discontinuous ring 35.

Each of the heels 40 of the first group delimits, with the two connecting portions 38 which extend from its ends, a space 50 that is intended to receive a ball 7. Thus, in the exemplary embodiment which is illustrated, each space 50 of the cage 30 is delimited by a heel 40 and the two connecting portions 38 that are adjacent thereto, respectively. In the exemplary embodiment illustrated in FIG. 3, eight spaces 50 are thus each delimited by a heel 40 associated with the space 50 and by two connecting portions 38 associated with the space 50.

Each of the heels 48 of the second group delimits, with the two connecting portions 38 which extend from its ends, a space 51. The space 51 can for example be filled with grease in order to reduce the friction, when the cage 30 is incorporated in a ball bearing, of the cage 30 against the races of the ball bearing.

With reference to FIG. 2, the cage 30 has a plurality of pairs of interposed parts 34, each pair being respectively provided to respectively cooperate with one of the balls 7 so as to keep it in position. In the exemplary embodiment shown, eight pairs of interposed parts 34 are fastened to the inside of the eight spaces 50, respectively, each pair of interposed parts 34 being attached to one of the eight balls 7, respectively. The interposed parts 34 can be made of a polymer material or of a metal material. The interposed parts 34 can be made by a molding, stamping or 3D printing method.

Figure 4:
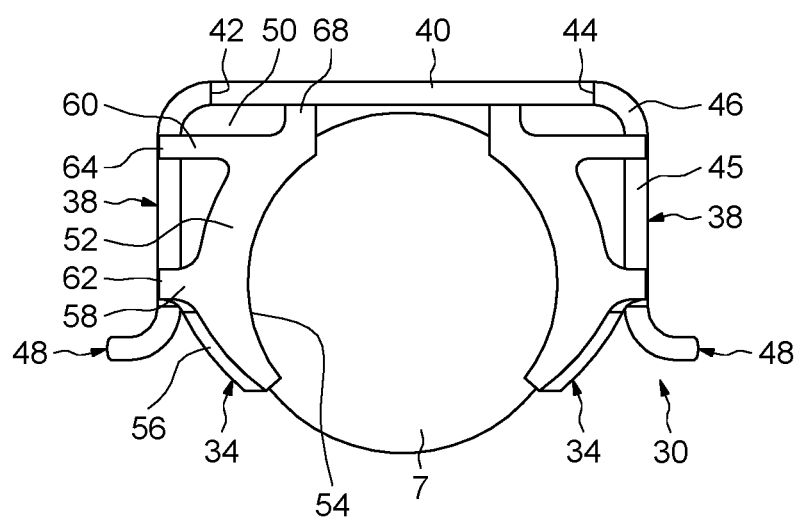
FIG. 4 is a partial top view of the cage in FIG. 2.

With reference now to FIG. 4, a space 50 may provide two interposed parts 34 that are generally disposed inside the space 50. It should be noted that the following description of the two interposed parts 34 that are shown in FIG. 4 applies equally to the other interposed parts of the cage 30. In the exemplary embodiment illustrated, the interposed parts 34 are all identical to one another. Alternatively, without departing from the invention, it is conceivable for the interposed parts 34 of each pair mounted inside the space 50 to have a different design from one another.

Each interposed part 34 may provide a body 52 intended to accommodate and hold a ball 7. To this end, the body 52 may provide a concave inner surface 54 that follows the spherical shape of the ball 7. Away from the surface 54, the body 52 may provide a convex outer surface 56. The body 52 of the interposed part 34 is situated entirely inside the space 50 shown. In other words, the body 52 is situated entirely in the circumferential direction between the two connecting portions 38 that delimit the space 50. Moreover, the body 52 is situated entirely on one side of the heel 40 delimiting the space 50.

The body 52 of each interposed part 34 also may provide coupling means for coupling the interposed part to the wire 32. For each interposed part 34, the coupling means comprise a first rib 58 and a second rib 60. The ribs 58 and 60 both extend from the outer surface 56 of the body 52. More particularly, each of the ribs 58 and 60 extends substantially in the plane perpendicular to the direction of the rectilinear part 45 of one of the connecting portions 38. The rib 58 may provide an end 62 away from the outer surface 56 of the body 52. In the same way, the rib 60 may provide an end 64 away from the outer surface 56. The ribs 58 and 60 each comprise a groove 66 (FIG. 2). Each groove 66 is made at the respective end 62, 64 of the associated rib. The two grooves 66 in the respective ribs 58 and 60 of an interposed part 34 are provided for the passage of and for retaining one and the same rectilinear part 45, belonging to that one of the two connecting portions 38 that is closest to the interposed part 34.

Moreover, each interposed part 34 may provide a third rib 68 extending from the outer surface 56. The third rib 68 extends substantially in the plane perpendicular to the direction of the heel 40. At its end away from the outer surface 56 of the body 52, the third rib 68 may provide a flat surface that is intended to come into linear contact with the heel 40.

With reference now to FIGS. 2 and 4, a ball 7 is thus in spherical contact with the inner surfaces 54 of two interposed parts 34 associated therewith, the inner surfaces 54 retaining the ball 7. On the other side, the interposed parts 34 are both in surface contact, via the grooves 66, with the rectilinear parts 45 of the connecting portions 38 delimiting the space 50 associated with the ball 7. Finally, the flat end surface of the ribs 68 of each of the two interposed parts 34 is in linear contact with the heel 40 delimiting the space 50.

Considering one of the two interposed parts 34, the combination of the spherical contact, the surface contact and the linear contact makes it possible to keep the interposed part in position with respect to the wire 32 when a ball 7 is fitted correctly. By contrast, the interposed part 34 can be moved easily with respect to the wire 32 when the ball 7 has not been fitted.

Consequently, a unit assembly made up of a first interposed part 34, the ball 7 and a second interposed part 34 is secured to the wire 32 and held immovably inside the space 50. The cage 30 thus maintains the circumferential space between the balls 7 of the ball bearing 2.

Figure 5:
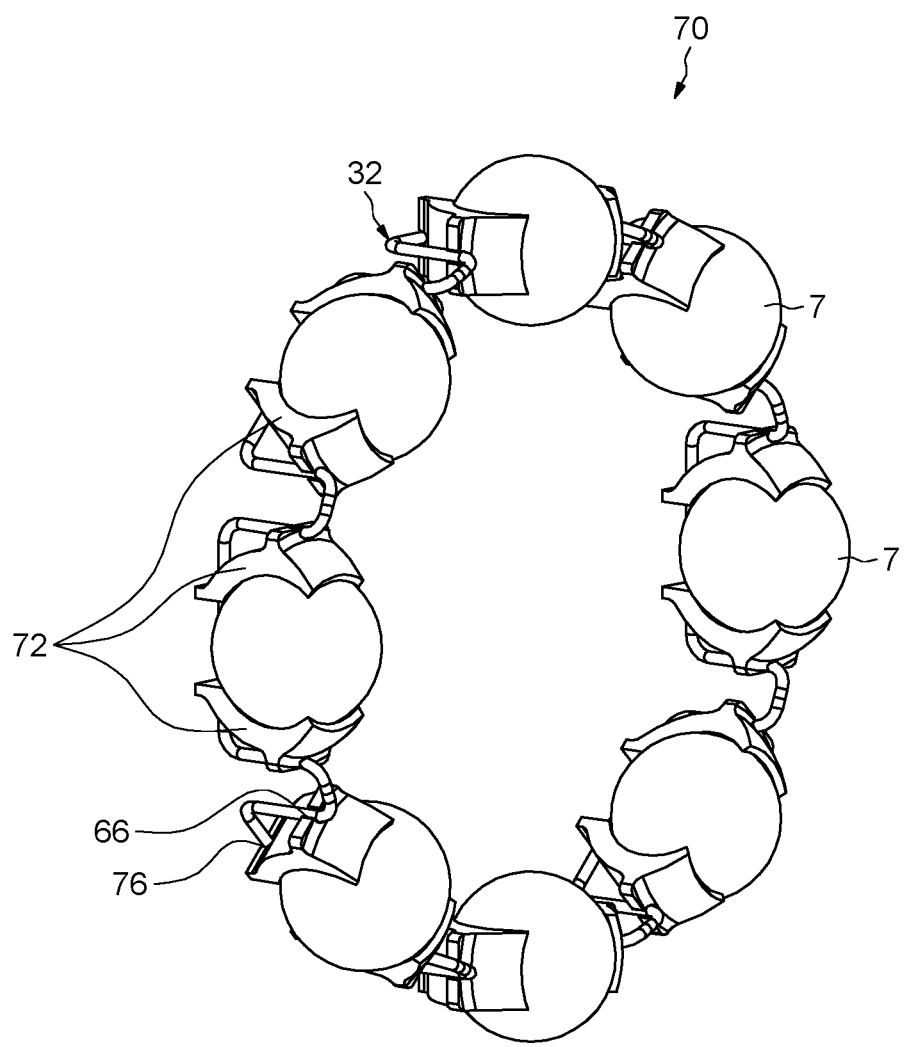
FIG. 5 illustrates a perspective view of a cage according to a second exemplary embodiment of the invention and also of a plurality of balls fitted in the cage.
Figure 6:
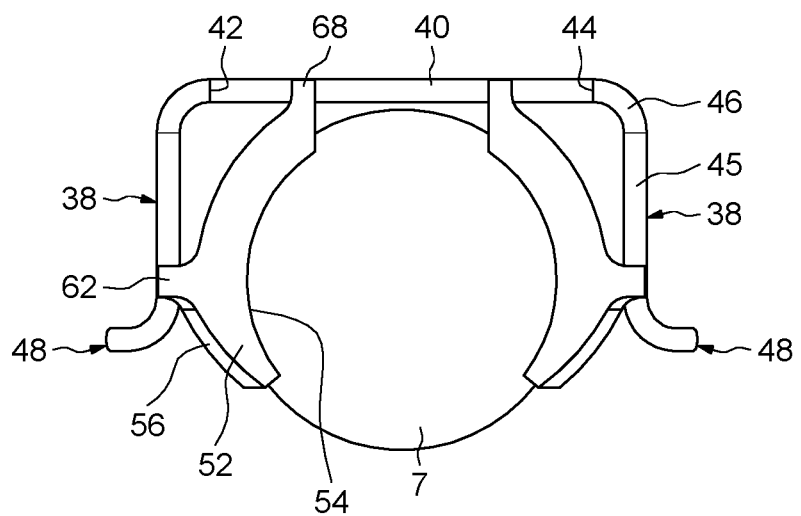
FIG. 6 is a partial top view of the cage in FIG. 5.

A cage 70 according to a second exemplary embodiment of the invention is shown in FIGS. 5 and 6. In order to make it easier to understand the invention, it should be noted that FIGS. 5 and 6 relate to the second exemplary embodiment in the same way as FIGS. 2 and 4, respectively, relate to the first exemplary embodiment. Furthermore, the elements of the cage 70 that are identical to those of the cage 30 bear the same references. In particular, the cage 70 may provide a wire 32 that has the same features as that of the cage 30. Furthermore, the balls 7 have been fitted in the cage 70. In this exemplary embodiment, each ball 7 is also kept in position by two identical interposed parts 72.

As shown in FIG. 6, in contrast to the interposed parts 34 of the first exemplary embodiment, the coupling means of each interposed part 72 do not comprise the rib 60. As can be seen in FIG. 5, the rib 68 may provide a groove 76 situated at its end away from the outer surface 56. The groove 76 is provided for the passage of and for retaining the heel 40. Thus, in this exemplary embodiment, the coupling means comprise the rib 60 and the rib 68.

In this way, the ball 7 is always in contact with the inner surfaces 54 of the two interposed parts 72. Each of the interposed parts 72 is in contact with the associated rectilinear part 45 via the groove 66 and is in contact with the heel 40 via the groove 72.

In this way, each of the two interposed parts 72 is kept in position with respect to the wire 32 when a ball 7 is fitted correctly.

Figure 7:
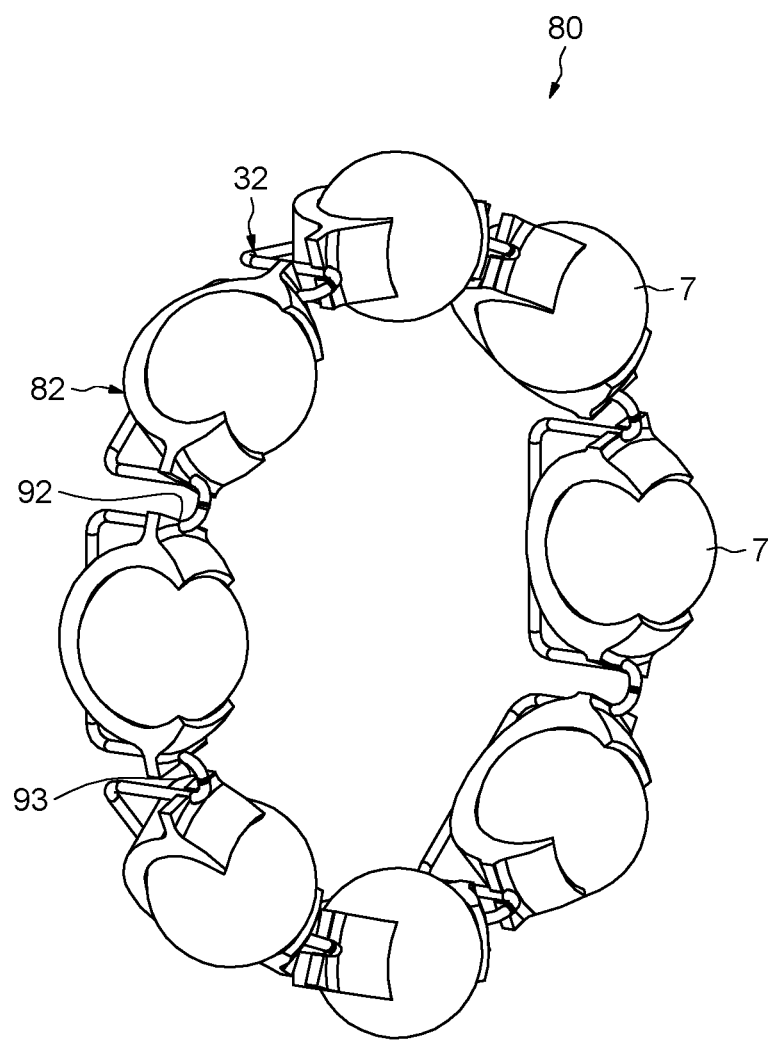
FIG. 7 illustrates a perspective view of a cage according to a third exemplary embodiment of the invention and of a plurality of balls fitted in the cage.
Figure 8:
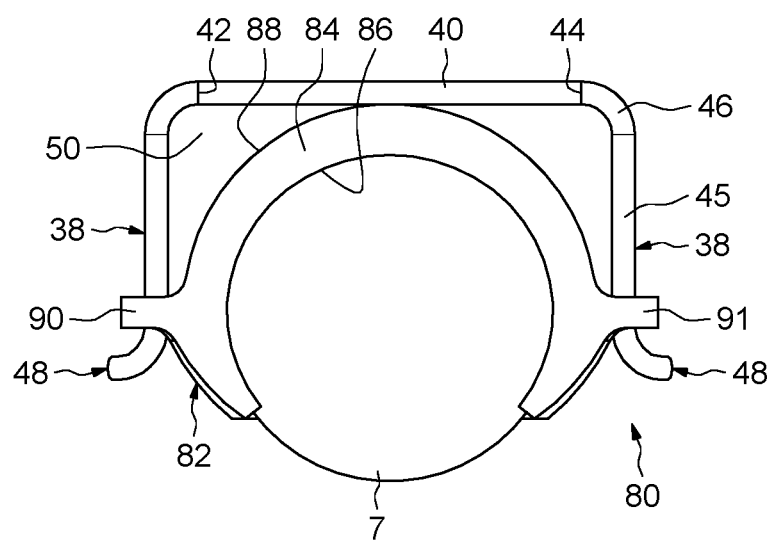
FIG. 8 is a partial top view of the cage in FIG. 7.

A cage 80 according to a third exemplary embodiment of the invention is shown in FIGS. 7 and 8. Like FIGS. 5 and 6, FIGS. 7 and 8 relate to the third embodiment in the same way as FIGS. 2 and 4, respectively, relate to the first embodiment. Furthermore, the identical elements bear the same references and balls 7 are shown disposed in their respective housings. In this exemplary embodiment, each ball 7 is kept in position by a single interposed part 82 inside the associated space 50.

With reference to FIG. 8, each interposed part 82 may provide a body 84 that is entirely situated inside the space 50. The body 84 is delimited by a concave inner surface 86 and a convex outer surface 88. In addition, the inner surface 86 has a substantially spherical shape so as to be able to surround the outer surface of a ball 7. In this exemplary embodiment, the body 84 preferably has a length that is at least sufficient for the inner surface 86 to be in contact with two diametrically opposite points on the outer surface of the ball 7.

Moreover, a first rib 90 and a second rib 91 that both extend from the outer surface 88 are provided. More particularly, the ribs 90 and 91 both extend in the same plane, in opposite directions. In other words, the rib 90 extends from the body 84 towards the connecting portion 38 closest to the end 42, the rib 91 extending from the body 84 towards the connecting portion 38 closest to the end 44. The plane in which the ribs 90 and 91 extend is a plane perpendicular to the direction of one of the rectilinear parts 45 of the two connecting portions 38. At its end away from the body 84, the rib 90 may provide a groove 92 provided for the passage of and for retaining the rectilinear part 45 of the connecting portion 38 closest to the end 42. The rib 91 for its part may provide, at its end away from the body 84, a substantially identical groove 93 that is provided for the passage of and for retaining the connecting portion 38 closest to the end 44. The outer surface 88 is substantially spherical so as to be able to come into point or linear contact with the heel 40.

In this way, the interposed part 82 is kept in position by two surface contacts and a point or linear contact. Thus, when a ball 7 is inserted correctly into an interposed part 82, the interposed part 82 is kept immovable with respect to the wire 32 inside the space 50.

It should be noted that, in this third exemplary embodiment, the body 84 of the interposed part 82 may provide a cavity delimited by the inner surface 86. Consequently, a ball 7 has to be forced through in order to be introduced into or extracted from this cavity. As a result, the balls 7 are held better with respect to the cage 80 and thus the ball bearing in which all of the balls and the cage 80 are fitted is stronger.

By contrast, in the first two exemplary embodiments, the housing is brought about by a pair of interposed parts 34 or 72 which constitute two separate parts. These exemplary embodiments, for their part, are advantageous in that they make it easier to introduce a ball 7 into or extract it from the housing formed by the interposed parts.

In light of the three exemplary embodiments which have been described, the invention makes it possible to maintain the circumferential space between the balls 7 by means of a cage with a relatively small mass compared with traditional cages. The production thereof is thus rendered easier, as is the fitting of the cage into and the removal thereof from a ball bearing.

Moreover, such a cage providing a wire and a plurality of interposed parts is more adaptable, notably having the advantage of being designed with respect to the diameter of the balls of a ball bearing and not with respect to the dimensions of all of the balls. Such a cage can thus be fitted in different types of ball bearing, the only constraint being that the balls have the same diameter.

A cage provided with a wire and a plurality of interposed parts is furthermore advantageous in the event of a manufacturing defect on one of the interposed parts, since it is only necessary to change the interposed part exhibiting the defect, it being possible to retain the other interposed parts.

Furthermore, the limited bulk brought about by this cage within a ball bearing allows better lubrication of the elements of the bearing and limits the friction of the elements with respect to the races and the cage. The invention thus allows an increase in the lifetime and/or the operating limitations of a ball bearing, such as the maximum operating speed, for example.

Furthermore, it should be noted that, in these three embodiments, each ball of the bearing is associated with at least one added part, i.e. an interposed part, that serves to form a housing therefor. Moreover, for each of the balls, the added part(s) associated with the ball serve(s) to hold this ball exclusively and therefore does not cooperate with the other balls. This results in an improvement in the strength of the bearing.

In the exemplary embodiments illustrated, the wire 32 of the cage is shaped such that the spaces 50 are all closed at the first discontinuous ring 35 and are open at the second discontinuous ring 36 with respect to the axial direction.

Alternatively, it would be possible to provide a cage in which the heels 48 of the second group have a larger circumferential dimension, for example substantially equal to that of the heels 40 of the first group. In this way, the spaces 51 are able to receive balls 7. The cage then may provide two groups of spaces that are intended to receive balls, the first group being made up of spaces 50 which are closed by a heel 40 at the first ring 35 and are open at the second ring 36, the second group being made up of spaces 51 which are closed by a heel 48 at the second ring 36 and are open at the first ring 35. In such an alternative embodiment, the balls 7 are thus introduced into the spaces 50 of the first group from the side of the second ring 36 and the balls 7 are introduced into the spaces 51 of the second group from the side of the first ring 35.

The invention claimed is:

1. A cage for a ball bearing, the cage comprising:
   a wire having a first group of heels that are spaced apart from one another in the circumferential direction and form a first discontinuous ring,
   a second group of heels that are spaced apart from one another in the circumferential direction and form a second discontinuous ring, and
   a plurality of connecting portions that each extend between one of the heels of the first group and one of the heels of the second group, wherein:
   the connecting portions and at least one of the heels of the first group and the heels of the second group delimit a plurality of spaces that are each intended to receive a ball of the bearing, wherein
   the cage also provides at least one interposed part that is disposed inside each space and is provided with a body for accommodating the ball and coupling means for fastening the body to at least one of the connecting portions of the wire delimiting the space, and wherein each of the bodies of the interposed parts is fully positioned in the circumferential direction between the connecting portions of the wire delimiting the space.

2. The cage according to claim 1, wherein each space is delimited by one of the heels of the first and second groups and by two successive connecting portions extending from the heel.

3. The cage according to claim 2, wherein each space is delimited by one of the heels of the first group.

4. The cage according to claim 1, wherein the coupling means of each interposed part comprises at least one rib that extends from an outer surface of the body of the interposed part and is provided with a groove shaped for the passage of and for retaining the wire.

5. The cage according to claim 4, wherein the groove is shaped for the passage of and for retaining the associated connecting portion of the wire.

6. The cage according to claim 1, further comprising for each space, exactly two interposed parts.

7. The cage according to claim 6, wherein the coupling means of each interposed part comprises at least a first and a second rib that each extend from an outer surface of the body of the interposed part, each of the first and second ribs being provided with a groove for the passage of and for retaining the associated connecting portion of the wire, the body of each interposed part providing a third rib that extends from the outer surface of the body of the interposed part and has a front surface in contact with the associated heel of the wire.

8. The cage according to claim 6, wherein the coupling means of each interposed part comprises at least a first and a second rib that each extend from an outer surface of the body of the interposed part, the first rib providing a groove for the passage of and for retaining the associated connecting portion of the wire, and the second rib providing a groove for the passage of and for retaining the associated heel of the wire.

9. The cage according to claim 1, further comprises, for each space, a single interposed part, the coupling means of each interposed part providing at least two ribs that extend from an outer surface of the body of the interposed part and are each provided with a groove for the passage of and for retaining two separate connecting portions of the wire.

10. A ball bearing comprising:
   an inner race,
   an outer race,
   a row of balls, and
   at least one cage having a wire having a first group of heels that are spaced apart from one another in the circumferential direction and form a first discontinuous ring,
   a second group of heels that are spaced apart from one another in the circumferential direction and form a second discontinuous ring, and
   a plurality of connecting portions that each extend between one of the heels of the first group and one of the heels of the second group, wherein:
   the connecting portions and at least one of the heels of the first group and the heels of the second group delimit a plurality of spaces that are each intended to receive a ball of the bearing, wherein
   the cage also provides at least one interposed part that is disposed inside each space and is provided with a body for accommodating the ball and coupling means for fastening the body to at least one of the connecting portions of the wire delimiting the space, and wherein
   each of the bodies of the interposed parts is fully positioned in the circumferential direction between the connecting portions of the wire delimiting the space.

* * * * *